United States Patent [19]

Nobutomo et al.

[11] 4,003,444
[45] Jan. 18, 1977

[54] CONSTRUCTION FOR UNITING THE BRAKE CASE COVER, REAR WHEEL AXLE CASE AND TERMINAL SPEED REDUCTION UNIT CASE OF TRACTOR

[75] Inventors: Kazunari Nobutomo, Soja; Seiiti Ikegami, Osaka; Masahide Osujo, Osaka; Yoshinobu Murayama, Osaka; Takaho Omura, Osaka; Sinzi Kawakami, Soja, all of Japan

[73] Assignee: Kuboto Tekko Co., Ltd., Osaka, Japan

[22] Filed: Oct. 3, 1975

[21] Appl. No.: 619,492

[30] Foreign Application Priority Data

Mar. 4, 1975 Japan .............................. 50-27508
Apr. 3, 1975 Japan .............................. 50-40856
Apr. 3, 1975 Japan .............................. 50-40857
Mar. 20, 1975 Japan .............................. 50-38909

[52] U.S. Cl. .......................... 180/75; 301/124 H; 301/126; 74/607; 29/415
[51] Int. Cl.² ........................................ B60K 17/00
[58] Field of Search ........... 301/124 R, 124 H, 125, 301/126, 129; 74/607; 29/463, 415; 180/88, 75, 54 D, 1 F

[56] References Cited

UNITED STATES PATENTS 2,247,668  7/1941  Rosenthal .......................... 180/1 F
2,378,615  6/1945  Brown .............................. 180/1 F

*Primary Examiner*—Robert B. Reeves
*Assistant Examiner*—Charles A. Marmor
*Attorney, Agent, or Firm*—Armstrong, Nikaido & Wegner

[57] ABSTRACT

Construction for uniting by welding a brake case cover, a rear wheel axle case and a terminal speed reduction unit case which are all made of sheet metal. The rear wheel axle case has at its opposite ends precisely circular tubular portions fitting in the brake case cover and in the terminal speed reduction unit case to connect them together. The united parts are joined together by automatic welding. The rear wheel axle case has a flat tubular intermediate portion for mounting a fender or the like thereon. The flat tubular portion has a smaller sectional area than the opposite end tubular portions so as to be substantially flexible and to thereby absorb concentric loads on the weld joints.

5 Claims, 9 Drawing Figures

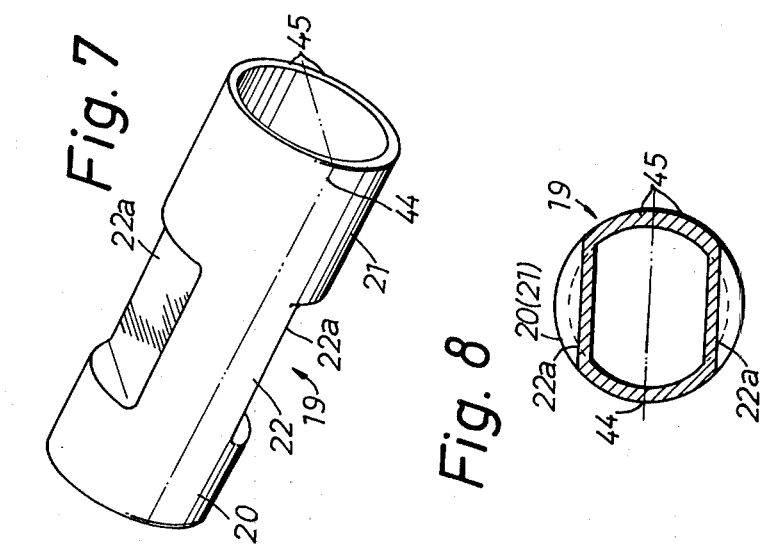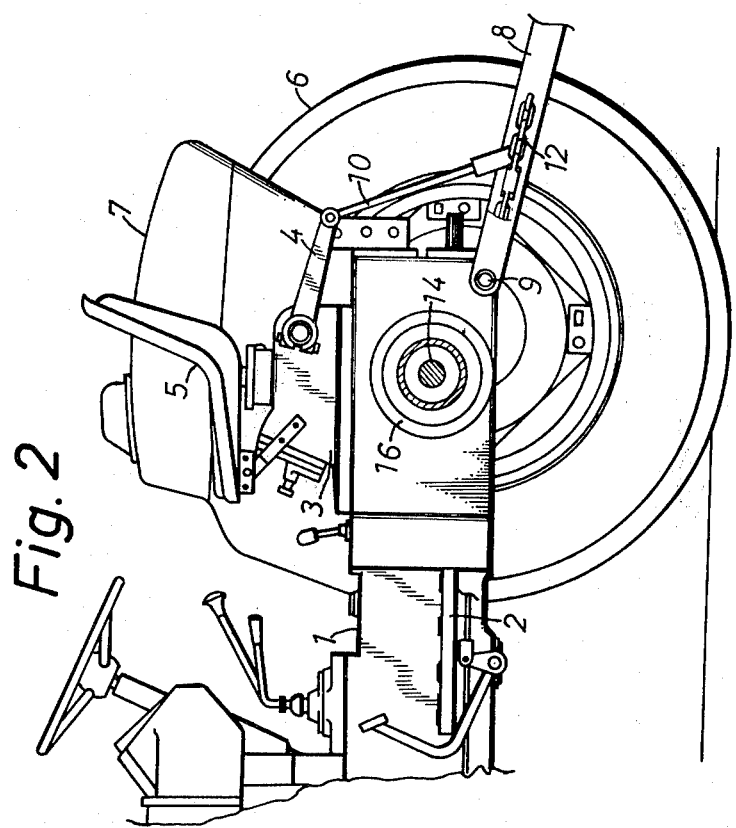

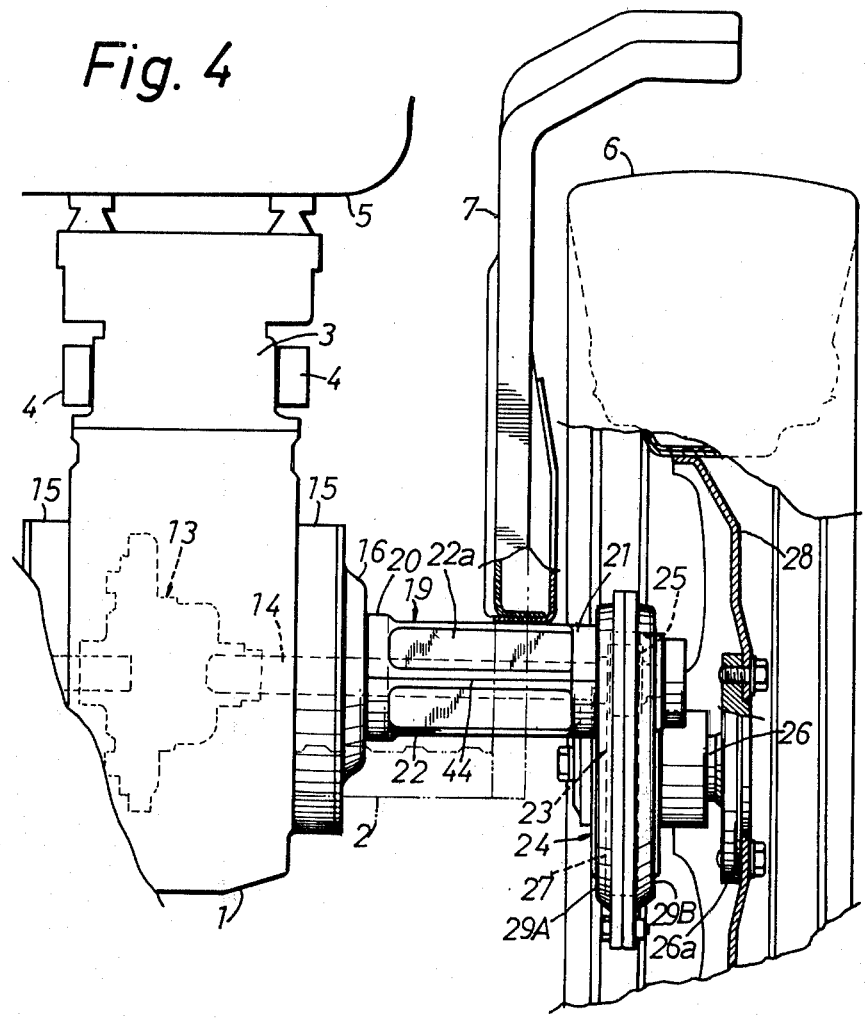
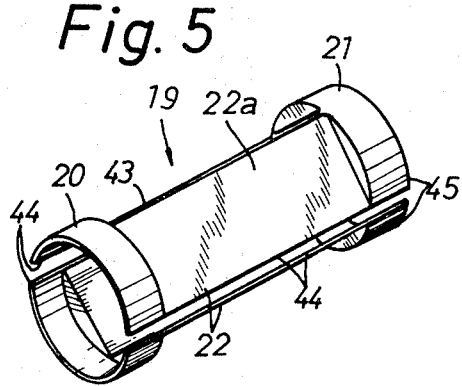
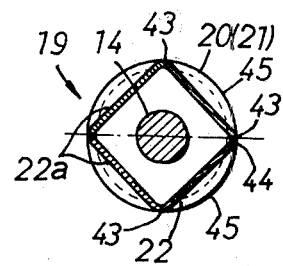

CONSTRUCTION FOR UNITING THE BRAKE CASE COVER, REAR WHEEL AXLE CASE AND TERMINAL SPEED REDUCTION UNIT CASE OF TRACTOR

BACKGROUND OF THE INVENTION

This invention relates to a construction for uniting the brake case cover, rear wheel axle case and terminal speed reduction unit case of a tractor, and more particularly to the above-mentioned cover and cases made of sheet metal and joined together by welding.

Generally the brake case cover, rear wheel axle case and terminal speed reduction unit case of tractors are made by casting. However, because the casting operation is very cumbersome and entails pollution problems and castings add to the weight of the tractor, it is desired to produce the cover and cases from sheet metal. When formed from sheet metal, these parts are usually joined together by welding, with the resulting problem that the weld joints concentrically subjected to loads become brittle and are therefore very prone to damage. Although sheet metal of greater thicknesses may supposedly be usable for the cover and cases, the parts will then become heavier to nullify the advantage which would otherwise be derived from the use of sheet metal. Alternatively the portions susceptible to concentric loads may be reinforced with additional members, but this will greatly increase the number of the manufacturing steps.

SUMMARY OF THE INVENTION

An object of this invention is to provide a brake case cover, rear wheel axle case and terminal speed reduction unit case which are all made of sheet metal and in which the rear wheel axle case is especially so shaped as to impart sufficient strength to the joints. tractors Another object of this invention is to provide the above-mentioned cover and cases which can be joined together by automatic welding and in which the rear wheel axle case has a flexible intermediate portion to afford sufficient strength to the joints and to make it possible to form the terminal speed reduction unit case from a very thin metal sheet.

Still another object of this invention is to provide a rear wheel axle case on which a fender or the like member is mountable without the need for a support for each member, notwithstanding that the case is made of sheet metal, and which is lightweight and easy to make.

BRIEF DESCRIPTION OF THE DRAWINGS

FIG. 2 is a view showing the same as seen in the direction of the arrows II—II in FIG. 1;

FIG. 4 is a fragmentary rear view partly broken away and showing another embodiment of this invention;

FIG. 5 is a perspective view showing the rear wheel axle case of FIG. 4 as divided into two segments;

FIG. 6 is a sectional view of the case of FIG. 5 as it is joined together;

FIG. 7 is a perspective view showing another embodiment of the rear wheel axle case;

FIG. 8 is a sectional view of the case of FIG. 7; and

DESCRIPTION OF THE PREFERRED EMBODIMENTS

Figure 1:
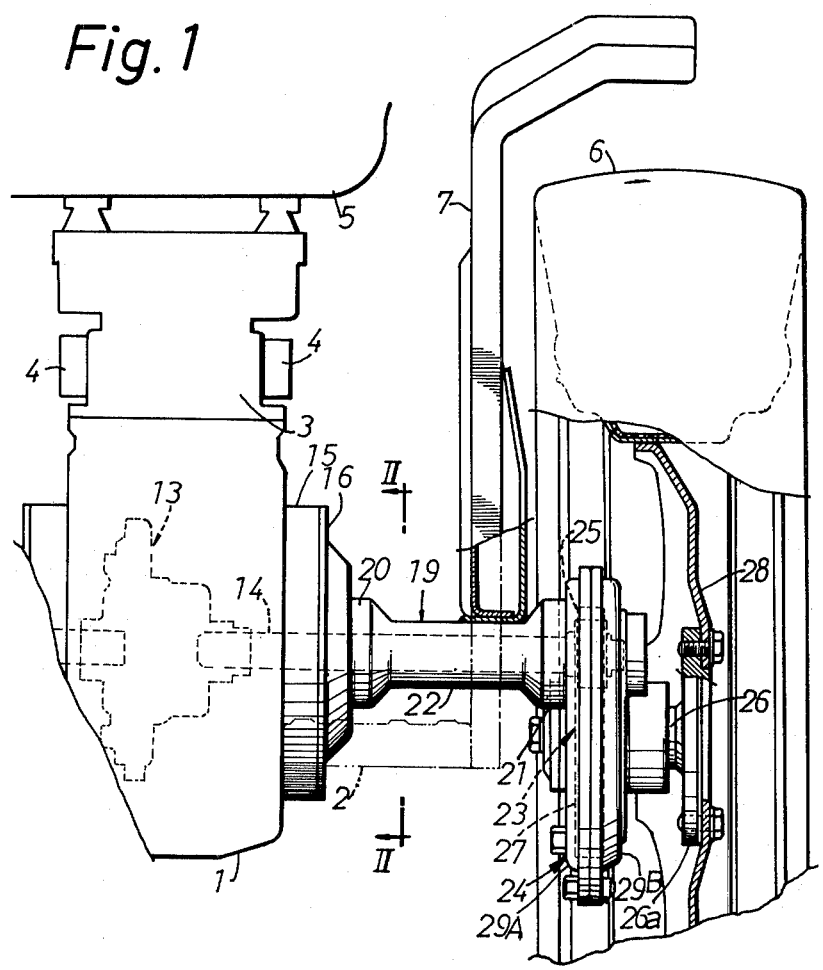
FIG. 1 is a fragmentary front view partly broken away and showing a tractor.
Figure 3:
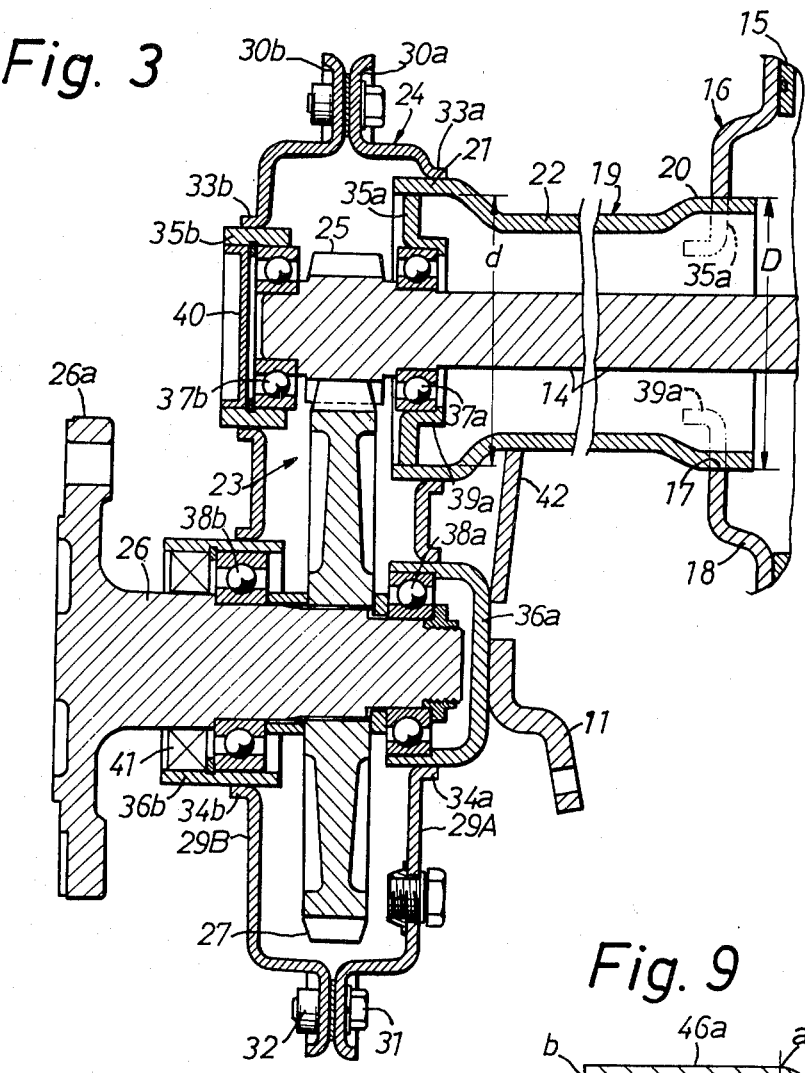
FIG. 3 is a fragmentary front view partly broken away to show the specific construction of the principal part.

With reference to FIGS. 1 to 3, a tractor frame 1 has a step 2 on each of the opposite sides of its center portion and a hydraulic unit 3 for raising and lowering working implements on its rear portion. The hydraulic unit 3 has a pair of lift arms 4. The tractor further includes a driver's seat 5, a pair of rear wheels 6 and fenders 7 disposed inside the rear wheels 6. A pair of lower links 8 constituting a three-point link means are supported by a pivot 9 on a rear end lower portion of the frame 1. Connected to an intermediate portion of the lower link 8 are a lift rod 10 connected to the lift arm 4 and a check chain 12 connected to a check chain bracket 11 shown in FIG. 3. The transmission case of the tractor serving as the frame 1 houses in its rear portion a known differential unit 13 having a differential yoke shaft 14 extending through each side wall of the tractor frame 1. The differential yoke shaft 14 is equipped with a brake case 15 housing known disk brake means. The brake case 15 is secured by unillustrated bolts to each side of the rear portion of the tractor frame 1. The brake case 15 is fitted with a brake cover 16 including a bulged portion 18 having a center hole 17 as seen in FIG. 3. The brake cover 16 is made of sheet metal.

A rear wheel axle case 19 covering the yoke shaft 14 is produced by pressing sheet metal into a tubular shape. The case 19 has precisely circular enlarged tubular portions 20 and 21 at its opposite ends and an intermediate portion 22 in the form of a flat tube. The flat tubular portion 22 has a smaller diameter than the enlarged tubular portions 20 and 21 and is slightly flexible. As shown in FIG. 3, the outer diameter D of the inner end enlarged tubular portion 20 is equal to the inner diameter $d$ of the outer end enlarged tubular portion 21. The inner tubular portion 20 fits in the hole 17 of the brake cover 16 and is joined to the cover 16 by welding along the entire periphery of the hole 17 where the portion 20 is in contact with the cover 16. The outer tubular portion 21 supports a case 24 housing a terminal speed reduction unit 23. The flat tubular portion 22 serves to support the fender 7 as well as a tool box, safety frame or the like which may be attached to its flat surface 22a.

FIG. 3 shows that the terminal speed reduction unit 23 comprises a small gear 25 formed at the outer end of the differential yoke shaft 14 integrally therewith and a large gear 27 splined to an axle 26 and meshing with the gear 25. The axle 26 is formed at its outer end with a flange 26a which is connected to the wheel disk 28 of the rear wheel 6 by bolts.

The case 24 covering the terminal speed reduction unit 23 comprises a pair of inner and outer segments 29A and 29B formed from sheet metal by press work. The segments 29A and 29B are joined together face-to-face by bolts 31 and nuts 32 fastening their flanges 30a and 30b to each other. The inner and outer segments 29A and 29B have upper apertured portions 33a and 33b formed by press work and concentric with each other when the segments are joined together. Similarly lower apertured portions 34a and 34b concentric with each other are formed in the segments 29A and 29B. A pair of upper bearing cases 35a and 35b are provided in the upper apertured portions 33a and 33b respectively to support the outer end of the differential yoke shaft 14, with bearings 37a and 37b interposed between the shaft 14 and the cases 35a, 35b. Likewise a pair of lower bearing cases 36a and 36b are provided in the lower apertured portions 34a and 34b respectively to support the inner end of the axle 26, with bearings 38a and 38b interposed between the axle 26 and the cases 36a, 36b. The apertured portion 33a has a sufficiently larger diameter than the opposing apertured portion 33b. The outer end enlarged tubular portion 21 of the rear wheel axle case 19 fits in and is welded to the apertured portion 33a. The bearing case 35a is in the form of a disk formed in its center with a cylindrical portion 39a for holding the bearing 37a. As indicated in the phantom line in FIG. 3, the piece punched out from the center of the brake cover 16 to form the hole 17 serves as the bearing case 35a. The case 35a fits in and is welded to the outer enlarged tubular portion 21 of the rear wheel axle case 19. Indicated at 40 is a cover, at 41 an oil seal and at 42 a reinforcing plate.

FIGS. 4 to 6 show another embodiment of the rear wheel axle case 19. The enlarged tubular end portions 20 and 21 of this embodiment have the same diameter. The flat tubular portion 22 of the embodiment has a square cross section, the diagonal of which is equal in length to the outer diameter of the tubular portions 20 and 21. The case 19 is composed of upper and lower segments 45 and 45 which are divided by a plane passing through the axis and two opposing corners 43 of the assembled case 19. Each of the segments 45 is produced by pressing a metal sheet of a unit area into a shape having circular arc curved portions at the opposite ends of its length and an intermediate portion including two planar parts arranged in V-shape in cross section. To complete the case 19, the segments 45 and 45 are arranged face-to-face, with the opposite longitudinal edges 44 of one segment abutting against the corresponding longitudinal edges 44 of the other segment, and the abutting edges 44 and 44 are welded together in the axial direction to provide two corners 43 at the opposite sides of the case 19. Accordingly the segments 45 can be made by press work and joined together by automatic welding at the edges 44.

Since the rear wheel axle case 19 has the precisely circular enlarged tubular portions 20 and 21 at the opposite ends, the case 19 is automatically weldable to the brake cover 16 and terminal speed reduction unit case 24. Furthermore, the fender 7 can be attached to the flat tubular portion 22 by welding.

FIGS. 7 and 8 show another embodiment of the rear wheel axle case 19 comprising a pair of divided segments 45. When the segments 45 are joined together at the abutting edges 44, the intermediate flat tubular portion 22 has upper and lower flat surfaces 22a in opposing relation to each other. This embodiment can also be produced from sheet metal, and the opposite end enlarged tubular portions 20 and 21 are automatically weldable to the brake cover 16 and terminal speed reduction unit case 24.

Figure 9:
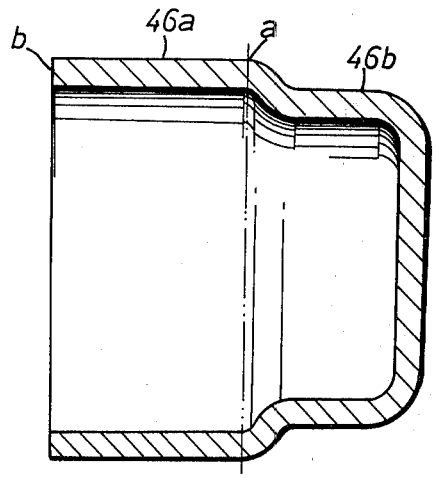
FIG. 9 is a sectional view showing a piece of pressed sheet metal before it is divided into two to obtain bearing cases for the rear wheel axle.

FIG. 9 shows a piece of pressed sheet metal from which the bearing cases 36a and 36b for the axle 26 are made. Sheet metal is pressed into the illustrated integral piece including a cylindrical portion 46a and a bowl-like portion 46b of a smaller diameter. The press work can be done by various methods. For example, the center of a metal sheet is made into the bowl-like portion 46b by drawing, and the larger cylindrical portion 46a is thereafter formed by drawing. When following this order, the drawing operation can be carried out very easily without reducing the wall thickness locally. The illustrated integral piece is then divided into the cylindrical portion 46a and the bowl-like portions 46b by cutting along the lines a and b. The cylindrical portion 46a now made open at both ends is usable as the bearing case 36b, while the bowl-like portion 46b having a stepped opening portion of an enlarged diameter is serviceable as the bearing case 36a.

As detailed above, the rear wheel axle case 19 made of sheet metal of this invention has at its opposite ends precisely circular tubular portions 20 and 21 which are larger than its intermediate portion in diameter. Since the tubular portions 20 and 21 are fitted in and welded to the brake cover 16 and to terminal speed reduction unit case 24 respectively, the weld joints have much greater modulus of section and therefore possess increased strength. Moreover, the parts can be joined together by automatic welding inexpensively. The intermediate portion of the axle case 19 is in the form of a flat tube of a reduced diameter and is accordingly rendered flexible to thereby effectively absorb concentric loads on the joint between the cover 16 and the case 19 and on the joint between the case 19 and the case 24. Thus the increased modulus of section and the flexibility imparted permit the weld joints to have sufficient strength, without the necessity of employing sheet metal of an increased thickness or additional reinforcement. The present construction is lightweight and economical therefore. The intermediate portion of the case 19 which is in the form of a flat tube can be utilized for securely and easily mounting the fender 7, safety frame, tool box or the like.

Because the bearing case 35a supporting the differential yoke shaft 14 fits in the enlarged tubular portion 21 at the outer end of the rear wheel axle case 19, the rear wheel axle case 19 is adapted to withstand the load acting on the ball bearing 37a, with the result that the terminal speed reduction unit case 24 is less likely to be affected. Consequently the terminal speed reduction unit case 24 can be formed from a thin sheet metal to further reduce the weight of the tractor.

When the rear wheel axle case 19 is so designed that the outer diameter D of the inner end enlarged tubular portion 20 is equal to the inner diameter d of the outer end enlarged tubular portion 21, the piece punched out from the brake cover 16 to form the hole 17 is usable as the bearing case 35a.

Further in the case where the rear axle case 19 is made of a pair of segments 45 and the corner-to-corner diametrical dimension of the intermediate portion 22 thereof is equal to the outer diameter of the enlarged tubular portions 20 and 21 when the segments 45 are axially joined together along the edges 44, the segments 45 can be produced from sheet metal with a simple die and the edges 45 are automatically weldable. Thus the case is very easy to manufacture.

What is claimed is:

1. A construction for uniting a brake case cover, a rear wheel axle case and a terminal speed reduction unit case in a tractor comprising a sheet metal brake cover case having a precisely circular hole and fixed to each side of a tractor main body to cover brake means, a rear wheel axle case for housing a differential yoke shaft which case is made of sheet metal and has precisely circular enlarged tubular portions at its opposite ends and a flat tubular intermediate portion of a reduced diameter for mounting a fender thereon, and a sheet metal case composed of a pair of inner and outer segments for housing the terminal speed reduction unit and having an upper portion for supporting the outer end of the differential yoke shaft and a lower portion for supporting a rear wheel axle, the inner end enlarged tubular portion of the rear wheel axle case being fitted in the hole of the brake case cover and welded to the hole-defining periphery of the brake case cover, the outer end enlarged tubular portion of the rear wheel axle case being fitted in the yoke shaft supporting upper portion of the terminal speed reduction unit case and welded to the inner periphery of the upper portion, the intermediate portion of the rear axle case being substantially flexible to absorb concentric loads on the weld joints.

2. A construction as defined in claim 1 wherein the rear wheel axle case comprises a plurality of circumferentially axially divided segments and the flat tubular intermediate portion has a square cross section the diagonal of which has a length equal to the outer diameter of the enlarged tubular portions, the segments being arranged face-to-face with the opposite edges of one segment axially welded to the corresponding edges of the other segments to form the opposite longitudinally extending corners of the case.

3. A construction as defined in claim 1 wherein the outer diameter of the inner end enlarged tubular portion of the rear wheel axle case is substantially equal to the inner diameter of the outer end enlarged portion thereof, and a piece punched out from the brake case cover to form the hole serves as a sheet metal bearing case.

4. A construction as defined in claim 1 wherein the flat tubular intermediate portion of the rear wheel axle case has upper and lower flat surfaces.

5. A construction as defined in claim 1 wherein the rear wheel axle supporting lower portion of the terminal speed reduction unit case is provided with a cylindrical bearing case for supporting an intermediate portion of the rear wheel axle and a bowl-like bearing case for supporting one end of the axle, and the bearing cases are produced from an integral press-shaped sheet metal piece including a cylindrical portion and a bowl-like portion of a smaller diameter by separating the piece into the two portions.

* * * * *